3,438,926
WATER BASE UNSATURATED INTERPOLYMER COATINGS
Oliver W. Burke, Jr., 506 Intracoastal Drive, Fort Lauderdale, Fla. 33304, Eldon E. Stahly, Ellicott City, Md., and Oscar M. Grace, Madison Heights, Mich.; said Grace and said Stahly assignors to said Burke
No Drawing. Continuation-in-part of application Ser. No. 854,560, Nov. 23, 1959. This application Jan. 24, 1966, Ser. No. 522,413
Int. Cl. C08f 15/40; C09d 5/02, 3/74
U.S. Cl. 260—29.7         14 Claims

ABSTRACT OF THE DISCLOSURE

Solvent resistant latex base coatings are prepared by polymerizing a first set of monomers comprising a vinylidene halide and a nitrile to substantial completion in the presence of from 0 to 0.5% emulsifier and adding to the polymerized latex a second set of monomers comprising a nitrile and a conjugated diene and polymerizing to substantial completion. The conjugated diene comprises from 5% to 45% of the total monomers in the final polymer.

This application is a continuation-in-part of our application Ser. No. 854,560, filed Nov. 23, 1959, now Patent No. 3,282,867, dated Nov. 1, 1966.

This invention relates to new and improved latex coating compositons commonly termed water-base coatings and more particularly this invention pertains to interpolymer plastomer latex water-base coating compositions.

In the prior art it was known that vinylidene halide copolymers such as vinylidene chloride-acrylonitrile copolymers are highly impervious to water. Such copolymers when prepared by mass (bulk) polymerization in relatively low molecular weight form and dissolved in a solvent such as methyl ethyl ketone to form a solution which is applied to surfaces by brushing or spraying, form a flexible film coating impervious to water when built up as a multilayer coating to a film thickness of 0.006 inch, however, thè hazards of toxicity and fire accompanying the use of volatile organic solvents in spraying, brushing and drying such coatings has been a disadvantage for many applications.

The present invention aims, inter alia, to prepare such polymers in latex form, and more particularly to improve such coating materials by producing them in the form of controlled interpolymer latices useful as protective coatings where hydrocarbon and water resistance is required, and on which it is not necessary to use plasticizers with the consequent likelihood of water penetration through pores remaining from leaching out of the plasticizer.

Other objects and advantages of particular embodiments of the invention will be apparent from the following general description and specific examples of the invention.

The invention resides in the new and useful interpolymer latex compositions herein disclosed, and in the new and useful processes for forming the same, herein disclosed, and is more particularly pointed out in the appended claims.

GENERAL DESCRIPTION

According to this invention a polymeric coating composition in latex form is provided characterized that the polymer of the latex comprises essentially interpolymer plastomer material, in that the said interpolymer material is interpolymer material containing unsaturation, in that said interpolymer comprises at least first and second segments of different polymer compositions, in that at least one of said different polymer compositions is a film-forming composition, in that at least one of said different polymer compositions is essentially hydrocarbon insoluble, in that at least one of said different polymer compositions is essentially water insoluble, in that said interpolymer material consists in major proportion (weight basis) of polymerized monomer material selected from a limited group of monomers containing and polymerizable through a single ethenoid ($>$C=C$<$) group (the monomers of Group I hereinafter defined), in that at least one of the different polymer compositions of said interpolymer segments consists in major proportion (weight basis) of a single monomer selected from said Group I, in that at least one of the polymer compositions of said interpolymer segments contains ethenoid ($>$C=C$<$) unsaturation and consists at least in part of polymerized material selected from a limited group of monomers containing at least two conjugated ethenoid ($>$C=C$<$) groups (the monomers of Group II hereinafter defined), in that the initially formed interpolymer segment is a saturated polymer composition and is formed at least in part from the monomer material set forth in Group I hereof with or without monomer material selected from a third group of monomers designated as Group III and containing only a single ethenoid group and copolymerizable through said ethenoid group with the monomers selected from Group I, in that said interpolymer material is composed at least in part of polymerized material selected from Groups I, II and III hereof, and said groups, more specifically consisting of:

Group I

Vinyl fluoride, vinylidene fluoride, vinylidene chloride, acrylonitrile and methacrylonitrile.

Group II

The unsaturated monomers containing from 4 to 12 carbon atoms and at least two unsaturated ethenoid groups in conjugated relation and copolymerizable through said ethenoid groups with the comonomer selected from Group I.

Group III

The unsaturated monomers containing only a single ethenoid group and copolymerizable through said ethenoid group with the monomers selected from Groups I and II and which contain not more than 21 carbon atoms.

In particular species according to this invention at least one of the different polymer compositions forming interpolymer segments may consist in major proportion of polymerized vinylidene halide; each of the different polymer compositions forming the interpolymer segments may comprises vinylidene halide; at least one of the different polymer compositions forming interpolymer segments may be comprised essentially of vinylidene halide and acrylonitrile; at least one of the different polymer compositions forming the interpolymer segments may comprise butadiene-1,3; one of the different polymer compositions forming the interpolymer segments may be comprised essentially of butadiene and acrylonitrile; at least one of the different polymer compositions forming the interpolymer segments may be a terpolymer; and at least one of the polymer compositions of said interpolymer segments may be a terpolymer consisting principally of polymerized vinylidene halide.

According to this invention, such composition comprising essentially interpolymer material in latex form may be produced by a process which comprises dispersing in an aqueous medium a polymerization catalyst and a first set of comonomers selected one from Group I and the remainder from Group III, polymerizing said first set of comonomers to produce first saturated copolymer therefrom dispersed in said aqueous medium, adding to the resulting copolymer dispersion (which may contain residual monomer of said first set) a second set of comonomers selected one from Group II monomers and the remainder from Group III monomers, polymerizing said second set of comonomers with said aqueous medium; selecting for at least said first set monomers which copolymerize to form interpolymer segments which are saturated and are essentially hydrocarbon insoluble; selecting for at least one of said set monomers, other than said first set monomers, copolymerizing to form interpolymer segments which are unsaturated and which are film forming; selecting for at least one of said sets monomers copolymerizing to form interpolymer segments that are essentially water insoluble, and selecting for said sets monomers which in the aggregate comprise a major proportion of monomer material selected from Group I.

Furthermore, in particular species of the process according to this invention, the first set of comonomers may be polymerized in the presence of a quantity of emulsifier not exceeding 0.5% by weight based on the monomer material dispersed in the aqueous medium, and when a sufficient proportion of monomers having sufficient water solubility (e.g., acrylonitrile) is employed in the first set, the first set may be polymerized in the absence of emulsifier to produce aqueously dispersed first copolymer material; the second set of monomers may either be polymerized in the presence of emulsifier not exceeding 0.5% by weight based on the monomer and polymer material present in the aqueous emulsion, or again, under the circumstances noted, may be polymerized without use of emulsifier. Preferably the monomers selected to form the interpolymer in accordance with this process in aggregate comprises a major proportion of vinylidene halide; most preferable vinylidene chloride, and in a particularly preferred embodiment, a minor proportion of acrylonitrile may be employed therewith.

The monomers employed in Group II as above indicated consist of the acyclic polyunsaturated monomers having 4 to 12 carbon atoms and having at least two ethylenically unsaturated groups which are conjugated and which include butadiene-1,3, isoprene, dimethylbutadiene, 2-chlorobutadiene-1,3, pentadiene-1,3, hexadiene-1,3, hexadiene-2,4, the conjugated octadienes and the dodecatrienes.

The monomers employed in Group III as above indicated include the unsaturated monomers other than those of Group I containing only a single ethenoid group and copolymerizable through said ethenoid group with the monomers selected from Group I and Group II. Such Group III monomers include vinyl acetate, vinyl stearate, styrene, α-methyl styrene, the vinyl toluenes, acrylic and methacrylic acids, acrylic and methacrylic esters such as methacrylate, 2-hydroxypropyl methacrylate, stearyl methacrylate, methoxyethyl acrylate, butoxyethyl acrylate, methyl acrylate, ethyl acrylate, propyl acrylate, butyl arcylate, octyl acrylate, dodecyl acrylate, cyclohexyl acrylate and the like; the alkyl fumarates, alkyl maleates, alkyl citraconates and alkyl itaconates such as dibutyl fumarate, dibutyl maleate, dibutyl itaconate and the like; vinyl-type ethers and ketones such as methyl vinyl ether, methyl vinyl ketone and related compounds such as methyl isopropenyl ketone and the like; the vinyl and vinylidene aldehydes such as acrolein, methacrolein; the vinyl and vinylidene amides such as acrylamide, methacrylamide; the N-alkyl acrylamides and N-alkyl methacrylamides, N-methyl acrylamide, N-methyl methacrylamide, N-ethyl acrylamide, N-tert.-butyl acrylamide; the unsaturated halogen containing monomers such as trichloroethylene, the chlorodifluoroethylenes, the dichlorofluoroethylenes, trifluoroethylene, perfluoroethylene, and perfluoropropylene; and the like, as well as other mono-unsaturated comonomers indicated to be useful for copolymerizing with vinylidene chloride and acrylonitrile in Krczil "Kurzes Handbuch der Polymerisationstechnik"—II Mehrstoff-Polymerisation," Akademische Verlagsgesellschaft, 1941, pp. 643–644 and 739, under the headings "acrylonitrile" and "vinylidene chloride."

Preferred and exemplified embodiments of the present invention among other things provides water-base or latex polymer coating compositions which have good adhesion to metals, especially iron and steel, as well as to wood and plastic materials, in the dried film form.

Also, the present invention, by a sequential polymerization process consisting of two or more polymerization steps can provide such latices with high polymer solids content with which pigments of both inorganic and organic types can be incorporated if desired by use of a minor amount of an appropriate surface-active agent, and further, such latices with or without pigment can be bodied to a consistency desired for either brush or spray application by use of less than 1% by weight of bodying agents based on dry polymer solids and such thickening or bodying agents include hydroxyethyl cellulose, carboxymethyl cellulose, methoxy celluloses, polyacrylamides, polyacrylic acids, natural gums including tragacinth, and other water soluble thickening agents.

The term "interpolymer" as used herein refers to the polymerization product of two or more sequential addition polymerizations of monomers containing and polymerizable through ethenoid ($>C=C<$) groups. Thus the term interpolymer includes graft polymer, block polymer, and conjunctive polymer.

As used herein the term "essentially emulsifier-free latex" connotes the polymer latices produced when employing no added emulsifier, or with amounts of emulsifier up to and slightly exceeding the critical micelle concentration (point of incipient micelle formation) or up to about 0.5% by weight concentration based on the monomer and polymer contents. By the term polymerizable monomer is meant any monomer containing one or more ethenoid groups and polymerizable through said unsaturated "carbon to carbon" linkages conventionally represented by $>C=C<$.

By the term "unsaturated interpolymer material" is meant the unsaturation provided by the interpolymers derived, at least in part, from monomer material copolymerizable with the monomers of Group I hereof and selected from the group consisting of the polyunsaturated monomers having 4 to 12 carbon atoms and having at least two ethlenically unsaturated groups which are conjugated; and of the total monomers converted to the interpolymer material 5 to 45% by weight, preferably 5 to 25% by weight, is selected from such polyunsaturated monomers, this interpolymer thereby being a tough plastomer especially useful in protective coating applications.

The present invention provides a two-step, three-step, or multi-step polymerization employing at least 50% of a vinylidene halide monomer, e.g., vinylidene chloride and/or vinylidene fluoride in the above specified proportions of polyunsaturated conjugated monomer material and the balance of other monomer material, especially monomers soluble in water at 25° C. to at least 1% by weight such as acrylonitrile or methacrylonitrile, acrolein, etc., and polymerizing such monomer materials in essentially emulsifier-free systems to produce stable latices under conditions of rapid polymerization. Other monomers employable in minor proportion and useful in this connection are crotonaldehyde, methacrolein, methylvinylketone, methylvinylether and the like.

In preparation of the polymer coating materials of this invention it is preferred to use emulsifiers slightly below the critical micelle concentration, or in amounts not exceeding 0.5% by weight based on the monomer and polymer material present in the aqueous dispersion.

EXAMPLES

With the foregoing general description in mind the invention will be readily understood from the following exemplary embodiments thereof, which embodiments are to be understood as illustrative and not restrictive of the invention.

Example 1

In this example the first step comprises polymerizing, at 60° C., 22.5 parts by weight of a mixture of 85% by weight of vinylidene chloride mixed with 15% by weight of acrylonitrile in 77 parts by weight of water containing 0.1 part by weight of the emulsifier sodium decylbenzene sulfonate and the catalyst for the polymerization, 0.3 part of potassium persulfate and 0.2 part by weight of sodium bisulfite, the reaction time being 2 hours during which the polymerization proceeded to substantially complete conversion of monomers. The polymer content of the copolymer latex so formed is 22.5% and the film formed, by drying this latex, is rigid and brittle. In the second step there is added 22.5 parts by weight of a mixture of 77% by weight vinylidene chloride, 15% by weight butadiene and 8% by weight acrylonitrile to the total latex from the first step together with 0.3 part by weight potassium persulfate and 0.2 part of sodium bisulfite and the temperature is maintained at 60° C. and the polymerization is essentially complete after 2 hours producing an interpolymer latex which contains 36% by weight polymer solids and forms a flexible water-resistant and fuel-resistant film upon drying. If desired to have a still higher solids content a third polymerization step can be carried out employing 0.1 part by weight of the sodium salt of dodecyl sulfate with a mixture of monomers such as vinylidene chloride, butadiene and acrylonitrile, in the same or similar relative proportions as the charges for the second step, but the amount of monomers in the third step should be adjusted so that the final solids is not over 60%, since higher latex solids are usually accompanied by the development of prefloc.

Example 2

22.5 weight parts vinylidene fluoride-acrylonitrile (85/15) are polymerized in a first polymerization step in 77 parts water as in Example 1 to a copolymer which has good water and solvent resistance but is brittle. For the latter in place of the 0.1 part by weight of sodium decylbenzene sulfonate, a salt of a perfluoroacid may be used, e.g., ammonium perfluoro-caprylate, up to 5% on the monomers, for producing a stable latex. 22.5 parts monomer mixture is then added to the latex of the first step and said monomer mixture being vinylidene chloride-acrylonitrile-dibutyl fumarate-butadiene (10/5/5/5) and is polymerized at 60° C. with the aid of 0.3 part by weight potassium persulfate and 0.2 part by weight of sodium bisulfite to give an interpolymer having film-forming properties and forming films resistant to water and hydrocarbon solvents.

Table I lists a number of illustrative compositions polymerized by the process of the present invention to form interpolymeric products thereof.

Examples 3 through 15

For brevity, Examples 3 through 15 are presented in tabular form in Table I.

Examples of monomer mixtures polymerized in the first and second steps of the emulsion process of the present invention (catalyst 1.0 part potassium persulfate and 0.5 part sodium sulfite by weight per 100 parts monomers); parts water/part Daxad 11 given on second line of each example.

TABLE I

| Examples: | First Step (parts)[1] | Second Step (parts)* |
|---|---|---|
| 3 | $VCL_2$-AN (90–10) 125/0.31 | BD-AN (30–20) 5/0.12. |
| 4 | $VCL_2$-AN-DBF (85–15–5) 125/0.31 | BD-AN-EHA (10–10–10) 15/0.15. |
| 5 | $VCL_2$-AN-DBF (90–10–5) 125/0.31 | BD-AN-DBF (10–5–10) 15/0.12. |
| 6 | $VCL_2$-AN (85–15) 125/0.30 | BD-AN (15–15) 5/0.12. |
| 7 | $VCL_2$-AN (80–20) 200/0.05 | BD-AN (22.5–22.5) 15/0.15. |
| 8 | $VCL_2$-AN (90–10) 125/0.31 | BD-AN-$VCL_2$ (20–10–10) 15/0.15. |
| 9 | $VCL_2$-AN (90–10) 125/0.31 | BD-AN-$VCL_2$-DBF (15–5–5–2.5) 15/0.15. |
| 10 | $VCL_2$-AN (90–10) 125/0.31 | BD-AN-EHA (40–10–10) 15/0.50. |
| 11 | $VCL_2$-AN (85–15) 150/0.23 | AN-I (20–20) 50/0.20. |
| 12 | $VCL_2$-VCL-AN (75–10–15) 125/0.40 | BD-AN-DBF (20–20–10) 15/0.10. |
| 13 | $VCL_2$-AN (90–10) 125/0.31 | BD-AN-$VCL_2$-DBF (15–5–5–7.5) 15/0.15. |
| 14 | $VF_2$-AN (90–10) 125/0.50 | BD-AN (15–10) 10/0.10. |
| 15 | $VF_2$-AN (90–10) 150/0.50 | BD-$VF_2$-AN (15–10–5) 10/0.15. |

[1] Abbreviations are as follows:
AN=acrylonitrile; BD=butadiene-1,3; EA=ethyl acrylate; EHA=2-ethylhexyl acrylate; DBF=dibutyl fumarate; BMA=butyl methacrylate; HMA=hexyl methacrylate; BOEA=butoxyethyl acrylate; MAN=methacrylonitrile; MMA=methyl methacrylate; CHMA=cyclohexyl methacrylate; $VCL_2$=vinylidene chloride; It=itaconic acid; $VF_2$=vinylidene fluoride; I=isoprene.

In each example of Table I, the second step polymerization was conducted in the latex from the first step, i.e., the monomers, water, Daxad 11, and additional catalyst in the amount specified under the second step in the table being added to the latex of the first step.

In Table I the partially water-soluble monomers include acrylonitrile and methacrylonitrile, which are especially effective monomers producing essentially emulsifier free interpolymers of the present invention; others which are less water soluble, in Table I, and still active in eliminating the need for the conventional amounts of emulsifier are methyl methacrylate, ethyl acrylate, and butoxyethyl acrylate. The polymerizations in Table I were all conducted at about 60° C. until monomer polymerizations were essentially complete. The reaction times varied from 1.5 to 18 hours.

The two-step interpolymers of Table I have been prepared in the form of latices containing about 0.1 to 0.45% by weight emulsifier (e.g., Daxad #11, a polymerized alkylnaphthalene sulfonate) and yielded latices having about 40 to 62% by weight polymer solids. By this invention all of these latices can be built up to from 50 to 60% solids by addition of a third monomer mixture (10 to 20 parts by weight) such as vinylidene chloride (40 to 75% by weight), acrylonitrile (10 to 20% by weight) and butadiene (15 to 40% or higher by weight) with or without the additions of further polymerization catalyst. Larger amounts of emulsifier do not interfere with polymerization but in general are not desired in the protective coating produced therefrom for reasons of lower water resistance of the films from the polymer thereof, as hereinbefore set forth.

Although potassium persulfate-sodium sulfite (1 part/0.5 part) was used as catalyst in all the examples of Table I, other free radical generating systems may be used in preparing the interpolymer latices in this invention.

Typical systems employed in this invention are, on the basis of 100 parts monomers:

| Catalyst | | Parts (by weight) |
|---|---|---|
| (a) | Potassium persulfate | 0.2 to 1.5. |
| | Sodium bisulfite | 0.1 to 0.75. |
| (b) | Potassium persulfate | 0.2 to 1.5. |
| | Sodium bisulfite | 0.12 to 0.25 |
| | Sodium bicarbonate | 0.25 to 0.5. |
| (c) | Azobis-(isobutyronitrile) | 0.5–3.0. |
| (d) | Diisopropylbenzene hydroperoxide | 1.25. |
| | Potassium pyrophosphate | 0.21. |
| | Ferrous sulfate | 0.19. |
| | Dodecylmercaptan | 0.1. |
| (e) | Benzoyl peroxide | 1.0–2.0. |
| (f) | Diisopropylbenzene hydroperoxide | 1.0. |
| | Tetraethylenepentamine | 0.2. |
| (g) | Cumene hydroperoxide | 1.5 to 3.0. |
| | Triethylenetetramine | 1.5 to 3.0. |
| (h) | Ammonium persulfate | 0.5 to 1.0. |
| | Tert.-dodecyl mercaptan | 0 to 0.1. |
| | Sodium bisulfite | 0.25 to 0.5. |

Many other similar catalysts systems were found satisfactory, for example, other organic peroxides such as t-butyl hydroperoxide, dicumyl peroxide, and tert.-butyl perbenzoate can be used instead of above shown peroxides. Hydrogen peroxide also was found useful instead of the potassium persulfate in the above latex formulas, but when hydrogen peroxide is used the pH of the system is preferably kept below 7.

Thus the present invention is not dependent on the use of any particular catalyst system.

The trace amount of emulsifier, usually employed in amount up to the critical micelle concentration (i.e., the point of incipient micelle formation) and usually less than 0.3 part based on total water present may be of the types exemplified by the following: alkyl sulfates, e.g., Duponol ME, Emulgator K–30; sodium alkylbenzene sulfonate, e.g., Ultra Wets, alkyl naphthalene sulfonates and polymeric forms thereof, e.g., Daxad #11 and Alrosperse 40K, Aerosol OS, Dianol ANS, and Alkanol B, alkyl sodium sulfosuccinates, e.g., Aerosol-OT and -22, soaps, e.g., alkali metal salts of fatty acids, polymeric emulsifiers, e.g., ammonium salt of styrene-maleic anhydride copolymers, and of vinyl chloride maleic anhydride, a polymeric sulfonate, e.g., Darvan #1, quaternary ammonium chlorides, e.g., Katapone VV–338, the polyoxyethylated nonylphenyl surfactants, e.g., Igepals and many other surfactants. Thus the present invention is not dependent on the use of any particular emulsifier. In addition to the trace amounts of emulsifier there may be employed in preparing the interpolymers hereof water soluble polymers particularly water soluble polyelectrolytes, e.g., the water soluble sodium salts of maleic anhydride-styrene copolymers (other examples useful for the purposes hereof are the water soluble polyelectrolytes set forth in U.S. application Ser. No. 53,068, filed Aug. 31, 1960) usually the quantity of such polyelectrolytes being less than 5% based on the monomer material forming the interpolymer hereof and in a quantity insufficient to make the interpolymer coatings pervious to water.

The latices resulting from the polymerizations of monomers of Table I as well as the latices prepared by additional polymerization steps conducted in those latices may be pigmented and bodied to a viscosity adapted to both brush and spray applications.

The examples of Table II are illustrative of the numerous latex coating compositions prepared according to the procedures of the present invention. Parts in every case were parts by weight.

TABLE II.—TYPICAL EXAMPLES OF COATING COMPOSITIONS OF THE PRESENT INVENTION
[Parts Based on 100 parts Interpolymer from Table I]

| Example: | Interpolymer Latex No. From Table I | Parts Daxad #11 | Pigments Incorporated (parts) | Parts Water | Bodying Agent (parts) |
|---|---|---|---|---|---|
| 16 | 7 | 0.12 | Dixie Clay (10); Iron Oxide Red-S (2) | 10 | Polyacrylamide 200 (0.9). |
| 17 | 7 | 0.1 | Wollastonite P-1 (5); Titania R-510 (5) | 9 | Polyacrylamide 200 (0.5). |
| 18 | 9 | 0.12 | Dixie Clay (10); Iron Oxide Red-S (2) | 10 | Polyacrylamide 200 (0.5). |
| 19 | 9 | 0.10 | Wollastonite P-1 (5); Titania (5) | 9 | Polyacrylamide 200 (0.5). |
| 20 | 10 | 0.06 | Dixie Clay (10); Iron Oxide Red-S (2); Sodium phosphate (0.04) | 10 | Cellosize WP 4400 (0.1) (hydroxyethyl-cellulose). |
| 21 | 5 | 0.05 | Blue Paste B (10) (Gen. Dyestuff Co.) | 100 | Ben-A-Gel (0.3) (magnesium montmorillonite). |
| 22 | 4 | 0.10 | Dixie Clay (15) (hard kaolin clay); Permansa Yellow (0.75) (Dupont) | 15 | Cellosize WP-4400 (0.05); Polyacrylamide-50 (0.45). |
| 23 | 4 | 0.10 | Iron Oxide Red-S (10); Sodium phosphate (0.04) | 9 | Cellosize WP-4400 (0.05); Polyacrylamide-50 (0.05). |
| 24 | 13 | 0.04 | Red Paste TPF (5) (Gen. Dyestuff Co.); Dixie Clay (5) | 15 | Ben-E-Gel (0.3) Cellosize WP-4400 (0.07). |
| 25 | 15 | 0.30 | White Lead (15); Red Lead (15) | 25 | Cellosize WP-4400 (0.1) (hydroxyethylcellulose). |

The amounts of pigments used in relation to the amount of interpolymer in the latex composition is in the range from about 3 parts by weight per hundred parts of interpolymer to about 150 parts or more by weight per hundred parts of interpolymer. The low range may be useful where tinting and gloss effects are desired; the intermediate amounts, from about 5 to 60 parts are useful where deeper colors, anticorrosion properties or improved water resistance are desired; and the high loading up to 150 parts or more are often useful in primer coatings for improved adhesion (of subsequent coatings) and to permit buffing prior to later coating applications.

The following example teaches in more detail the preparation of high solids, emulsion type pigmented coatings and their application for the protection of metal surfaces. This procedure was employed in preparing the coatings exemplified in Tables I and II. These coatings are particularly effective in protecting surfaces exposed to water and/or organic solvents. The polymerizations were carried out in 32 oz. glass bottles, each fitted with a metal cap and a rubber gasket. The rate of conversion was determined by the progressive increase in total solids content of the latex.

Example 26

The initial interpolymer latex material was prepared according to the following polymerization recipe:

Step I—                                      Parts by weight
  Vinylidene chloride _____ 90
  Acrylonitrile _____ 10

Step 1—                                    Parts by weight
    Daxad #11 (77%)[1] _____ [2] 0.4
    Water _____ 125.0
    Potassium persulfate _____ 1.0
    Sodium bisulfite _____ 0.5

[1] Polymerized sodium salt of alkylnaphthalene sulfonic acid.
[2] 0.3 active.

The monomers were premixed and added with the water to the bottle followed by the emulsifier, persulfate and bisulfite in that order. The bottle was flushed with nitrogen, capped and rotated 2 to 3 hours at 60° C.

Step II—Added to bottle of above latex:      Parts by weight
    Butadiene _____ 20.0
    Acrylonitrile _____ 10.0
    Vinylidene chloride _____ 10.0
    Daxed #11 (77%)[1] _____ [2] 0.2
    Water _____ 15.0
    Ammonium persulfate _____ 0.125
    Sodium bisulfite _____ 0.125

[1] Polymerized sodium salt of alkylnaphthalene sulfonic acid.
[2] 0.15 active.

The sodium bisulfite, ammonium persulfate and emulsifier were added as a water solution to the latex obtained in Step I. The vinylidene chloride and acrylonitrile were then added as a mixture followed by the butadiene. The bottle was capped and rotated 2 hours at 60° C. to essentially quantitative conversion. Total solids assayed 48.2 weight percent.

Formulation of latex paint

The following ingredients were added to 100.0 g. (dry basis) of the latex prepared in accordance with the teachings of the above example:

Ingredient (solutions)—                    Parts by weight
    Daxad #11 (10% by wt.) _____ 2.0 (0.2 active)
    Polyacrylamide (2% by wt.) _____ 25.0 (0.5 active)

The ingredients were added slowly with mild stirring of the latex. The pigmentation of the latex was accomplished by adding slowly with stirring a pigment dispersion prepared in the following manner:

Pigment dispersion (ground 16–24 hrs. in a pebble mill)

Ingredients:                               Parts by weight
    Dixie Clay _____ 10.0
    Iron Oxide Red-S Pigment [3] _____ 2.0
    Daxad #11 (10%)[1] _____ [4] 0.5
    Polyacrylamide-200 (2%)[2] _____ [5] 20.0

[1] Polymerized sodium salts of alkyl naphthalene sulfonic acid, a product of Dewey & Almy Chemical Company.
[2] Polyacrylamide 200, a product of American Cyanamid Company.
[3] Red Oxide 3121, a product of Mineral Pigments Corp.
[4] 0.05 active.
[5] 0.4 active.

The formulated coatings were applied to sand-blasted medium tensile hull steel panels with a DeVilbiss No. P–EGA–502 spray gun at 30–40 p.s.i. A drying period of one to twenty-four hours was allowed between coats to minimize the possibility of water entrapment under the coatings. Three to four coats were required to obtain a coating thickness of about six mills. The coating provided excellent protection against solvents and water.

While there have been described herein what are at present considered to be preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

We claim:
1. A process for producing an interpolymer plastomer coating composition in aqueous dispersion by at least two sequential steps of addition polymerization of monomer materials which contain and are polymerizable through at least one ethenoid group, in the presence of a free radical polymerization catalyst; which process consists essentially of:
   (a) dispersing in an aqueous medium containing a free radical polymerization catalyst and from 0.0 to 0.5% by weight of an emulsifier based on the weight of said monomer materials, a first set of at least two different comonomers selected, one from the vinylidene halides of Group I and one from the nitriles of Group I and any remainder from the class consisting of Groups I and III, hereinafter set forth, said first set consisting in major proportion of halide monomer,
   (b) polymerizing said first set of comonomers to substantial completion to produce a first copolymer therefrom dispersed in said aqueous medium,
   (c) adding to the resulting copolymer dispersion a second set of at least two different comonomers including at least a nitrile and at least a diene selected from Group II and any remainder from the class consisting of Groups I, II and III, hereinafter set forth,
   (d) polymerizing said second set of comonomers with said dispersed first copolymer in said aqueous dispersion in the presence of a free radical polymerization catalyst and from 0.0 to 0.5% by weight of an emulsifying agent based on the weight of the polymer and monomer in step (c), in a second step to form interpolymer dispersed in said aqueous medium,
   (e) said Group I consisting of the monomers vinyl fluoride, vinylidene fluoride, vinylidene chloride, acrylonitrile, and methacrylonitrile,
   (f) said Group II consisting of the acyclic monomers having from 4 to 12 carbon atoms and containing and polymerizable through at least two conjugated ethenoid groups,
   (g) said Group III consisting of the unsaturated monomers other than the monomers of Group I and which contain only a single ethenoid group and not more than 21 carbon atoms and are copolymerizable with the monomers selected from Group I and Group II,
   (h) the monomers selected for said second set being monomers which copolymerize to form interpolymer segments that are film-forming,
   (i) the monomers selected for said first set being monomers which copolymerize to form interpolymer segments that are essentially hydrocarbon insoluble,
   (j) the monomers selected for at least one of said sets from said respective groups as aforesaid being monomers which copolymerize to form interpolymer segments that are essentially water insoluble, and
   (k) the monomers selected for said several sets from said respective groups as aforesaid being monomers which in the aggregate consist essentially of at least 50% by weight of monomer material selected from Group I, and from 5 to 45% by weight of monomer materials selected from Group II.
2. A process as defined in claim 1, wherein sets of monomers are selected which in the aggregate consists essentially of at least 50% by weight vinylidene halide.
3. A process as defined in claim 1, wherein sets of monomers are selected which in the aggregate consist essentially of at least 50% by weight of vinylidene chloride, a proportion of acrylonitrile, and a proportion of butadiene.
4. A product of the process of claim 1.
5. A coating composition as claimed in claim 4, wherein at least one of said different polymer compositions consists of at least 50% by weight of polymerized vinylidene halide.
6. A coating composition as claimed in claim 4, wherein at least one of said different polymer compositions consists essentially of vinylidene halide and acrylonitrile.

7. A coating composition as claimed in claim 4, wherein said first segments consist essentially of vinylidene halide copolymer and said second segments consist essentially of butadiene-acrylonitrile copolymer.

8. A coating composition as claimed in claim 4, wherein the latex contains a quantity of emulsifier not exceeding 0.5% by weight based on the interpolymer content of the latex.

9. A coating composition as claimed in claim 4, in which said first segments constituting the major proportion by weight of said interpolymer consist essentially of saturated copolymer of vinylidene chloride and nitrile monomer from the group consisting of acrylonitrile and methacrylonitrile.

10. A coating composition as claimed in claim 4, in which said first segments constituting the major proportion by weight of said interpolymer consist essentially of saturated copolymer of vinylidine chloride and acrylonitrile.

11. A coating composition as claimed in claim 4, in which said first segments constituting the major proportion by weight of said interpolymer consist essentially of saturated copolymer of vinylidene fluoride and nitrile monomer from the group consisting of acrylonitrile and methacrylonitrile.

12. A coating composition as claimed in claim 4, in which said first segments constituting the major proportion by weight of said interpolymer consist essentially of saturated copolymer of vinylidine fluoride and acrylonitrile.

13. A coating composition as claimed in claim 4, in which said first segments constituting the major proportion by weight of said interpolymer consist essentially of saturated copolymer of vinyl fluoride and nitrile monomer from the group consisting of acrylonitrile and methacrylonitrile.

14. A coating composition as claimed in claim 4, in which said first segments constituting the major proportion by weight of said interpolymer consist essentially of saturated copolymer of vinyl fluoride and acrylonitrile.

References Cited

UNITED STATES PATENTS

| | | | |
|---|---|---|---|
| 2,894,927 | 7/1959 | Elder et al. | 260—29.6 |
| 2,842,518 | 7/1958 | Irvin | 260—29.7 |
| 2,994,683 | 8/1961 | Calvert | 260—879 |
| 2,996,469 | 8/1961 | Cole et al. | 260—29.7 |
| 2,614,089 | 10/1952 | Harrison et al. | 260—29.7 |

SAMUEL H. BLECH, *Primary Examiner.*

J. T. GOOLKASIAN, *Assistant Examiner.*

U.S. Cl. X.R.

260—879, 880